(12) United States Patent
Heverly

(10) Patent No.: US 7,199,369 B1
(45) Date of Patent: Apr. 3, 2007

(54) LOW THRESHOLD LEVEL RADIATION DETECTOR

(75) Inventor: Matthew Heverly, Grants Pass, OR (US)

(73) Assignee: Met One Instruments, Inc., Grants Pass, OR (US)

( * ) Notice: Subject to any disclaimer, the term of this patent is extended or adjusted under 35 U.S.C. 154(b) by 178 days.

(21) Appl. No.: 10/831,418

(22) Filed: Apr. 23, 2004

Related U.S. Application Data

(60) Provisional application No. 60/488,079, filed on Jul. 16, 2003.

(51) Int. Cl.
  *G01T 1/20* (2006.01)
(52) U.S. Cl. ................................. 250/361 R
(58) Field of Classification Search ............. 250/361 R
  See application file for complete search history.

(56) References Cited

U.S. PATENT DOCUMENTS 4,720,426 A * 1/1988 Englert et al. .............. 428/344

6,933,502 B2 * 8/2005 Okada et al. ................ 250/367
6,934,354 B2 * 8/2005 Hoffman ....................... 378/19
6,943,354 B2 * 9/2005 Sakai ..................... 250/361 R

OTHER PUBLICATIONS

Met One Instruments, Inc., E-BAM Mass Monitor, http://www.metone.com/pdf/ebam_stack.pdf, Jul. 1, 2001, 2 pages.
Met One Instruments, Inc., Beta-Attenuation Mass Monitor, http://www.metone.com/pdf/BAM1020_LD_DS.pdf, Oct. 24, 2002, 2 pages.

* cited by examiner

*Primary Examiner*—David Porta
*Assistant Examiner*—Christopher Webb
(74) *Attorney, Agent, or Firm*—Law Office of Karen Dana Oster, LLC

(57) ABSTRACT

A radiation detector of the present invention has at least one radiation measuring component and a radiation detector surface. A layer of protective covering substantially covers the radiation detector surface and protects the at least one radiation measuring component. The layer of protective covering preferably includes a protective material sub-layer and may include an optional coating sub-layer. The radiation detector surface may be, for example, a scintillator, cover glass, or chip surface.

12 Claims, 3 Drawing Sheets

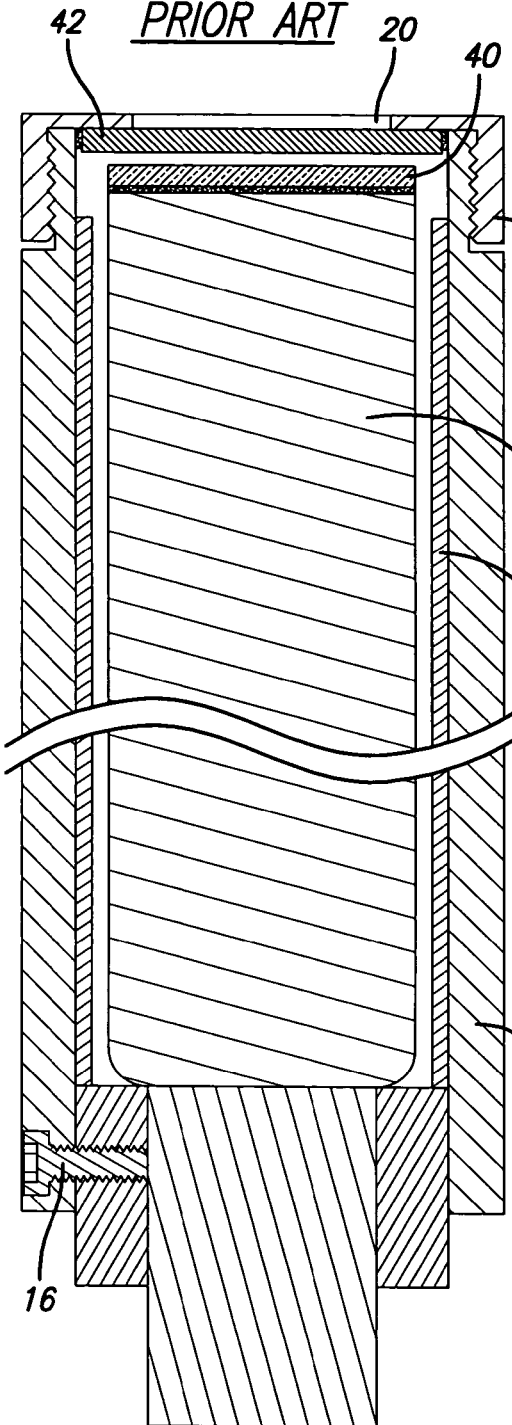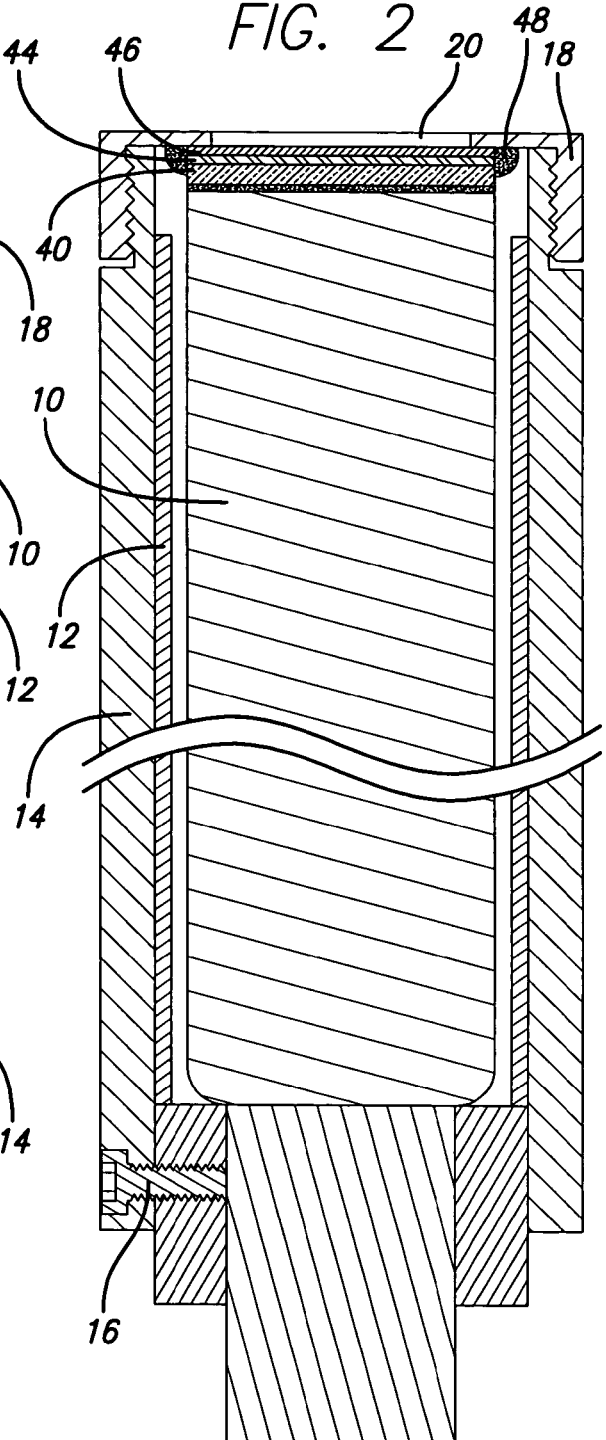

LOW THRESHOLD LEVEL RADIATION DETECTOR

The present application is an application claiming the benefit under 35 USC Section 119(e) of U.S. Provisional Patent Application Ser. No. 60/488,079, filed Jul. 16, 2003. The present application is based on and claims priority from this application, the disclosure of which is hereby expressly incorporated herein by reference.

BACKGROUND OF INVENTION

The present invention is directed to a low threshold level radiation detector in which reflective material is directly applied to a radiation detector surface without a separate window cover to allow detection of low levels of radiation.

Radiation detection devices or radiation detectors typically use a window cover such as an aluminum window or an aluminized MYLAR® polyester film window (MYLAR® is a biaxially oriented, thermoplastic film made from ethylene glycol and dimethyl terephthalate (DMT)) to cover the radiation detector components such as Photomultiplier Tubes (PMTs), Geiger-Mueller Tubes (GMTs), or Solid State Detectors (SSDs). An exemplary PMT is shown in FIG. 1 and an exemplary SSD is shown in FIG. 3.

A PMT is a sensitive photocell used to convert light signals of a few hundred photons into a usable current pulse without significantly increasing noise. A PMT may include a photocathode coupled to an electron multiplier structure contained within a glass envelope. The photocathode may include a photosensitive layer that converts as many of the incident light photons as possible into low-energy electrons. The number of photoelectrons produced will be comparable to the number of incident light photons and thus, the charge on the photoelectrons will be too small to provide a detectable electrical signal. The electron multiplier section may include an arrangement of dynodes that serves both as an efficient collection geometry for the photoelectrons and a nearly ideal amplifier that greatly increases the number of electrons. After amplification, a typical scintillation pulse will give rise to $10^7$–$10^{10}$ electrons, sufficient to generate a charge signal that can be collected at the anode. PMTs in general, perform a highly linear charge amplification producing an output pulse that, over a wide range, is proportional to the number of original photoelectrons. Much of the timing information of the original light pulse is also retained. When illuminated by a very short duration light pulse, most tubes will produce an electron pulse with a time width of a few nanoseconds after a delay of only 20–50 ns. For exemplary purposes only, one PMT is the R647-01 that is made and/or sold by Hamamatsu of Japan.

An SSD generally consists of a piece of silicon, germanium, cadmium zinc telluride (CdZnTe), or other material that emits an electrical signal in response to ionizing radiation. SSDs may be, for example, an X-ray detector that uses a scintillation crystal coupled to a solid-state photodiode to convert the incident X-ray intensity to an electric current. Solid state detectors have very high X-ray stopping efficiency (compared to the xenon detector) and are compact (compared to detectors using a photomultiplier tube). For exemplary purposes only, one SSD is the PIN10D1 that is made and/or sold by UDT Sensors, Inc. of Hawthorne, Calif.

As mentioned, current radiation detectors use window covers to cover the radiation detector components. The thickness of the window cover material will attenuate low energy radiation. The amount of attenuation depends on the strength and type of radiation and the thickness and type of material used for the window. Typical aluminum windows are approximately 50–75 microns thick. Typical aluminized MYLAR® windows are approximately 50–75 microns thick with a 0.08 micron thick aluminum material added for light reflection. The window cover serves three purposes. First, the window cover blocks ambient light from entering the radiation detector. Ambient light could cause errors in the measured radiation. The external light may also cause temporary/permanent damage to sensitive components. Second, the window cover focuses scintillated light into the measuring device. Scintillators will emit a photon in any direction. Photons that are emitted out of the measurement device will be redirected to make a correct measurement. This is especially important in the PMTs. Third, the window cover protects sensitive components from damaging agents such as gasses and solids in the measured medium.

Due to the window cover's thickness, however, the window cover also attenuates a portion of the radiation being measured (e.g. low energy radiation) in that the energy cannot penetrate the window cover. This attenuation can reduce the amount of measured radiation that is detected and/or measured. In other words, the attenuation caused by the thickness of the window cover can introduce significant errors in results produced by the radiation detection devices. Accurate detection of radiation is critical and erroneous results can be dangerous.

BRIEF SUMMARY OF THE INVENTION

The present invention is directed to a low threshold level radiation detector in which reflective material is directly applied to a radiation detector surface without a separate window cover to allow detection of low levels of radiation. The present invention, therefore, is an improvement on existing radiation detectors because it allows a lower detectable threshold and more accurate readings. The radiation detector of the present invention, therefore, is capable of measuring lower energy or lower levels of radiation more accurately than known radiation detectors.

The present invention is directed to radiation detector having at least one radiation measuring component and a radiation detector surface. A layer of protective covering substantially covers the radiation detector surface and protects the at least one radiation measuring component. The layer of protective covering includes a protective material sub-layer and may include an optional coating sub-layer. The radiation detector surface may be, for example, a scintillator, cover glass, or chip surface.

The foregoing and other objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 is a cross-sectional side view of a prior art PMT prior to modification according to the present invention.

FIG. 2 is a cross-sectional side view of a PMT of FIG. 1 after modification according to the present invention wherein a thin layer of protective covering is applied to a radiation detector surface such as the scintillator surface.

DETAILED DESCRIPTION OF THE INVENTION

Figure 3:
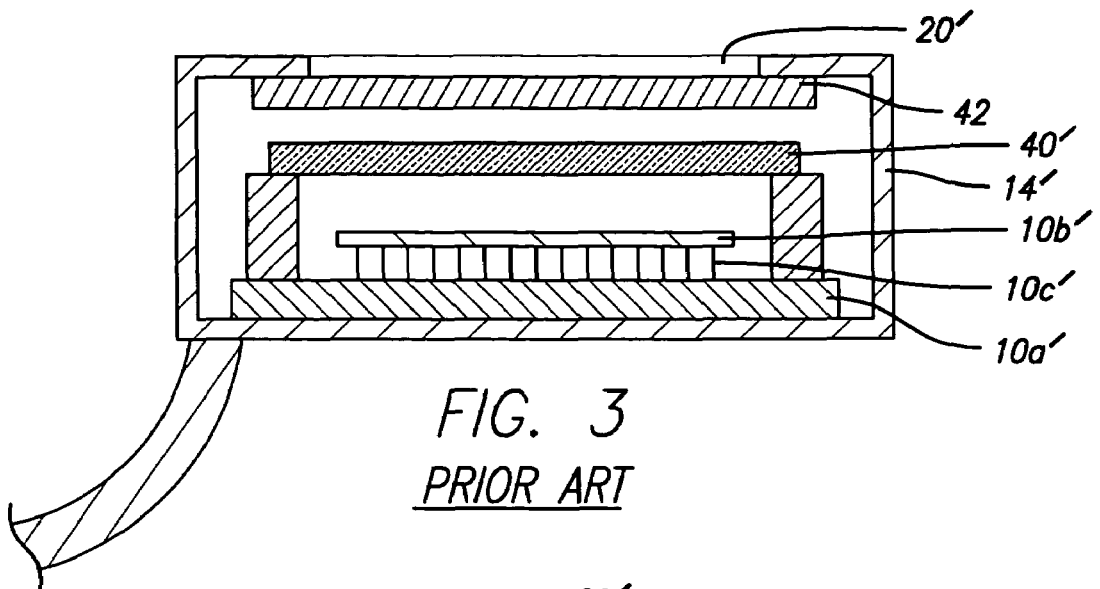
FIG. 3 is a cross-sectional side view of a prior art SSD prior to modification according to the present invention.

The present invention is directed to a low threshold level radiation detector in which a thin layer of protective covering is directly applied to a radiation detector surface without a window cover to allow detection of low levels of radiation. The present invention improves existing radiation detectors by allowing a lower detectable threshold and readings that are more accurate. The attenuation of low-level radiation by structural window cover material used in typical radiation detectors is reduced when the window cover is not present. The radiation detector of the present invention, therefore, is capable of measuring lower energy or lower levels of radiation more accurately than known radiation detectors.

As mentioned, current radiation detectors use structural material or window covers to cover radiation detector components. The window cover serves three necessary purposes: blocking ambient light from entering the radiation detector, focusing scintillated light into the measuring device, and protecting sensitive components from damaging agents such as gasses and solids in the measured medium. The disadvantage of these window covers is that the thickness of the material will attenuate low energy radiation. The amount of attenuation depends on the strength and type of radiation and the thickness and type of material used for the window cover. Typical aluminum window covers are 50–75 microns thick. Aluminized MYLAR® window covers are typically 50–75 microns thick. Due to the thickness of these window covers, low energy radiation cannot penetrate and will not be measured.

Instead of adding a separate window cover, the present invention uses existing components of the radiation detector (e.g. existing radiation detector surfaces such as a scintillator, cover glass, or exterior surface of a chip) as structure to support a thin layer of protective covering.

Structure that may support a thin layer of protective covering includes, for example, existing window material such as a scintillator. A scintillator is a substance or device that glows when hit by high-energy particles. In one preferred embodiment, the invention uses the scintillator to support the thin layer of protective covering. It should be noted that the term "lens" may be used to refer to the scintillator material. In an alternative embodiment, a cover glass is used to support the thin layer of protective covering. In yet another alternative embodiment the thin layer of protective covering may be supported by a chip surface. It should be noted that these radiation detector surfaces that serve as structure for supporting the thin layer of protective covering are meant to be exemplary and are not meant to limit the scope of the invention.

The thin layer of protective covering preferably serves the same purposes as the window cover in previous radiation detectors. Specifically, the thin layer of protective covering blocks ambient light from entering the radiation detector, which could damage sensitive components or cause errors in the measured radiation. The thin layer of protective covering also reflects stray photons into the radiation detector to be measured. This is especially important in PMT radiation detectors. Finally, the thin layer of protective covering protects sensitive components from damaging gasses and solids in the measured medium.

In one preferred embodiment of the invention, the thin layer of protective covering may be a combination of sub-layers such as a protective material sub-layer and an optional coating sub-layer. The protective material sub-layer may be approximately 60 nanometers (nm) thick. The protective material sub-layer may be a reflective material (a reflective material layer) such as aluminum, gold, silver, or any material with reflective characteristics. This protective material sub-layer is preferably a two surface mirror, although alternative embodiments could use a single surface mirror. The first exterior surface reflects ambient light protecting the PMT from damaging light. The second interior surface reflects emitted photons from the scintillator back into the radiation detector components. The coating sub-layer may be approximately 60 nanometers (nm) thick. The coating sub-layer may be a layer of silicon oxide, magnesium fluoride, oxidized aluminum, or any coating suitable to protect the "light tightness" (efficiency of reflecting photons e.g. at 420 nm) of the protective material sub-layer. The primary purpose of the coating sub-layer is to protect the exterior surface of the protective material sub-layer and, depending on the protective material sub-layer may be optional. The thickness of the coating sub-layer depends on the strength and wavelength of ambient light, the response of the radiation detector, and other factors. The coating sub-layer could be substantially thinner or thicker if the flux of the radiation was different or if the wavelength was different. In one preferred embodiment of the present invention, the thin layer of protective covering of the present invention has a thickness of less than 1% of the thickness of the window covers currently in use. Reducing the thickness of the thin layer of protective covering increases the threshold of the radiation detectable.

Exemplary Embodiments

The figures have been specifically drawn to show clearly the present invention. To do this, however, it was necessary to modify the proportions of the invention. Accordingly, the proportions shown in the drawing are not to be considered as limiting the present invention. It should be noted that similar components in different figures have been labeled with the same reference numeral or as a "prime" or "double prime" of a like component.

FIG. 2 shows a PMT according to the present invention that is a modified version of a prior art PMT such as that shown in FIG. 1. Both the prior art PMT and the PMT of the present invention include a photomultiplier tube 10 (one type of sensitive radiation measuring component) surrounded by magnetic shielding 12 within an outer housing 14. The photomultiplier tube 10 is positioned within the outer housing 14 using a securing apparatus 16 such as a setscrew. An enclosure cap 18 with a cap window 20 defined therein is also present in both embodiments. The prior art PMT of FIG. 1 also includes a radiation detector surface such as a scintillator 40 positioned at the top of the photomultiplier tube 10 and a window cover 42 secured within the enclosure cap 18 such that it covers the cap window 20. The present invention, as shown in FIG. 2, does not have a window cover 42 and the scintillator 40 has a thin layer of protective covering shown as a combination of a protective material sub-layer 44 and an optional coating sub-layer 46. In the shown embodiment, the scintillator 40, protective material sub-layer 44, and coating sub-layer 46 (together herein after referred to as the protective lens package) are secured to the enclosure cap 18 to cover the cap window 20. In the shown embodiment the protective lens package is secured to the enclosure cap 18 using an adhesive 48 (shown on the outer peripheral surface of the protective lens package, but other positions are possible). Preferably, the adhesive is non-reactive with the scintillator material and non-out gassing. Alternative embodiments may use other securing mechanism (e.g. structural securers such as clips or tabs) to secure the protective lens package to the enclosure cap 18, may secure the protective lens package to the enclosure cap 18 to the top of the photomultiplier tube 10, or may be held in place by pressure (e.g. if a special protective lens package was designed to fit into the enclosure cap 18 or by the protective lens package being sandwiched between the top of the photomultiplier tube 10 and the bottom of the enclosure cap 18).

Figure 4:
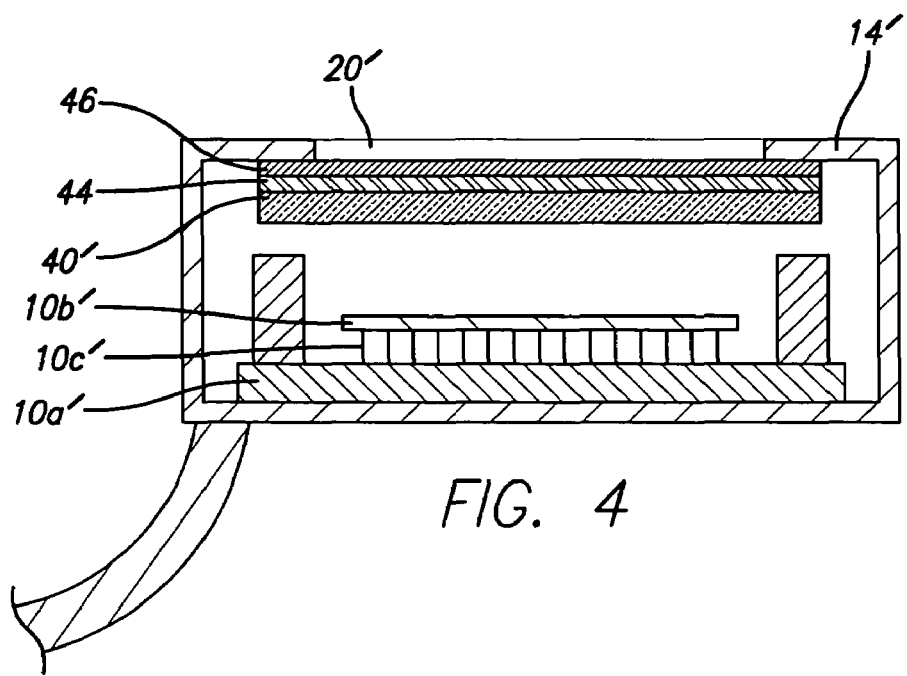
FIG. 4 is a cross-sectional side view of a SSD of FIG. 3 after modification according to the present invention wherein a thin layer of protective covering is applied to a radiation detector surface such as a cover glass.

FIG. 4 shows a SSD according to the present invention that is a modified version of a prior art SSD such as that shown in FIG. 3. Both the prior art SSDs and the SSD of the present invention include SSD components (shown as a printed circuit board 10a', a chip 10b', and wires 10c' connecting the printed circuit board 10a' and the chip 10b'). SSD components are one type of sensitive radiation measuring component. In both embodiments, the SSD components are enclosed in an outer housing 14'. A housing window 20' is defined in the outer housing 14' in both embodiments. The prior art SSD of FIG. 3 also includes a radiation detector surface such as a cover glass 40' positioned above the SSD components and a window cover 42 secured so that it covers the housing window 20'. The present invention, as shown in FIG. 4, does not have a window cover 42 and the cover glass 40' has a thin layer of protective covering shown as a combination of a protective material sub-layer 44 and an optional coating sub-layer 46. In the shown embodiment, the cover glass 40', protective material sub-layer 44, and coating sub-layer 46 (together herein after referred to as the protective lens package) are secured to cover the housing window 20'.

Figure 5:
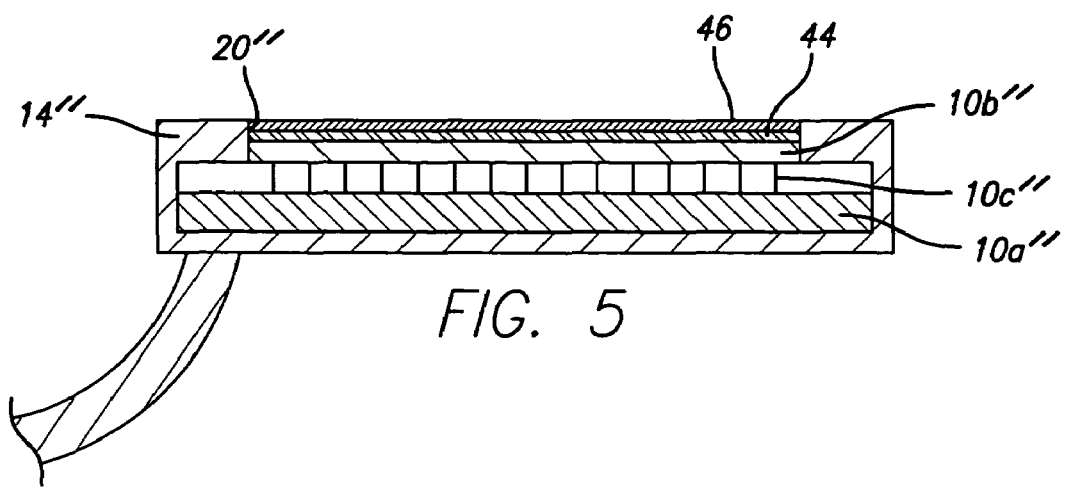
FIG. 5 is a cross-sectional side view of an alternative SSD of according to the present invention wherein a thin layer of protective covering is applied to a radiation detector surface such as a chip surface.

FIG. 5 shows a SSD according to the present invention that has been specially designed for the present invention. This embodiment includes SSD components (shown as a printed circuit board 10a", a chip 10b", and wires 10c" connecting the printed circuit board 10a" and the chip 10b") enclosed in an outer housing 14". A housing window 20" is defined in the outer housing 14". In this embodiment, the exterior (shown as upper) surface of the chip 10b" has a thin layer of protective covering shown as a combination of a protective material sub-layer 44 and an optional coating sub-layer 46. In the shown embodiment, the chip 10b", protective material sub-layer 44, and coating sub-layer 46 (together herein after referred to as the protective lens package) are secured to cover (shown as positioned within) the housing window 20".

Yet another embodiment of the preferred embodiment of the present invention may be used to detect low-level radiation. For example, an exemplary radiation detector is a Beta Attenuation Mass monitor such as the E-BAM Mass Monitor produced by the assignee of the present invention. The E-BAM Mass Monitor is a PMT that is designed to measure radioisotope Carbon-14. This radioisotope is considered a soft beta emitter. This means the beta radiation is low level and easily attenuated. Early tests of the present invention show that the radiation detector is more sensitive to the Carbon-14 beta emissions than prior art embodiments. Specifically, stability tests have shown that an unmodified E-BAM has an average beta count of 92281 per minute and a modified E-BAM has an average beta count of 149877 per minute. In addition, smoke tests have shown that an unmodified E-BAM has an intercept rate of 0.012 mg/m3 and a modified E-BAM has an intercept rate of 0.006 mg/m3. The increase in stability is proportional to the square root of the signal (based upon Poissons's statistics for radiation sources).

Method of Construction

In one embodiment of the present invention, the radiation detector is constructed and assembled as a new product. The methods of construction used would be similar to known methods except that a window cover 42 would not be necessary and that a thin layer of protective covering would be applied to at least one radiation detector surface.

In an alternative embodiment of the present invention, the radiation detector created by modifying a known radiation detector. For example, the embodiment of FIG. 2 may be made by modifying the embodiment of FIG. 1. Similarly, the embodiment of FIG. 4 may be made by modifying the embodiment of FIG. 3. A modification method would include the steps of removing a window cover 42 and applying a thin layer of protective covering to at least one radiation detector surface. For purposes of providing an example, the following modification method could be used to create a radiation detector of the present invention from a known radiation detector.

Figure 6:
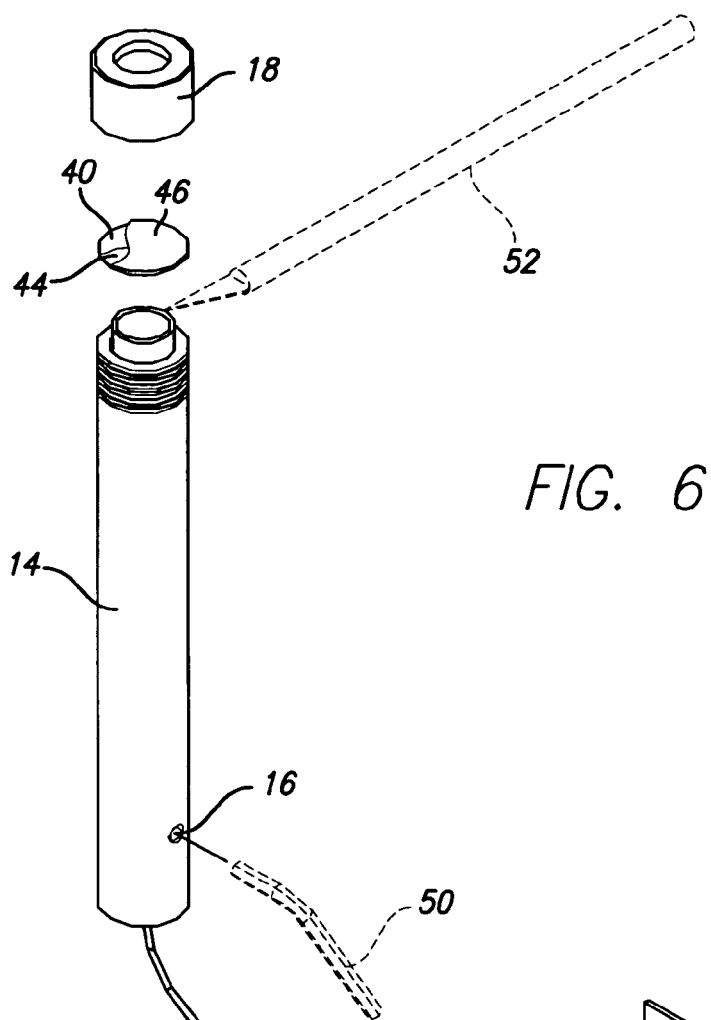
FIG. 6 is an exploded perspective view of one preferred embodiment of the present invention.

As shown in FIG. 6 the enclosure cap 18 may be removed from the PMT. The window cover 42 (shown in FIG. 1) should be carefully removed from the enclosure cap 18 along with any adhesive. Then, using a tool such as an alien wrench 50, the securing apparatus 16 may be loosened such that the inner body (photomultiplier tube 10 and magnetic shielding 12) may be pushed up and the scintillator 40 may be accessed. Using a removing tool 52 (e.g. an X-acto knife), the scintillator 40 may be carefully removed. As a practical matter, it should be carefully noted which scintillator lens surface is the exterior lens surface (shown as the top surface) and which surface is the interior lens surface (shown as the bottom surface). The scintillator 40 would then be coated with a thin layer of protective covering or replaced with a new protective lens package. The protective lens package is then placed in the enclosure cap 18 to cover the cap window 20 with the coated surface facing the exterior of the PMT. In the shown embodiment the protective lens package is secured to the enclosure cap 18 using an adhesive 48 (e.g. a plurality of small dots of epoxy equally spaced between the edge of the protective lens package and the enclosure cap 18). The height of the inner body can then be adjusted so that it touches the bottom surface of the scintillator 40 and the securing apparatus 16 tightened. Finally, the enclosure cap 18 may be replaced on the PMT.

Figure 7:
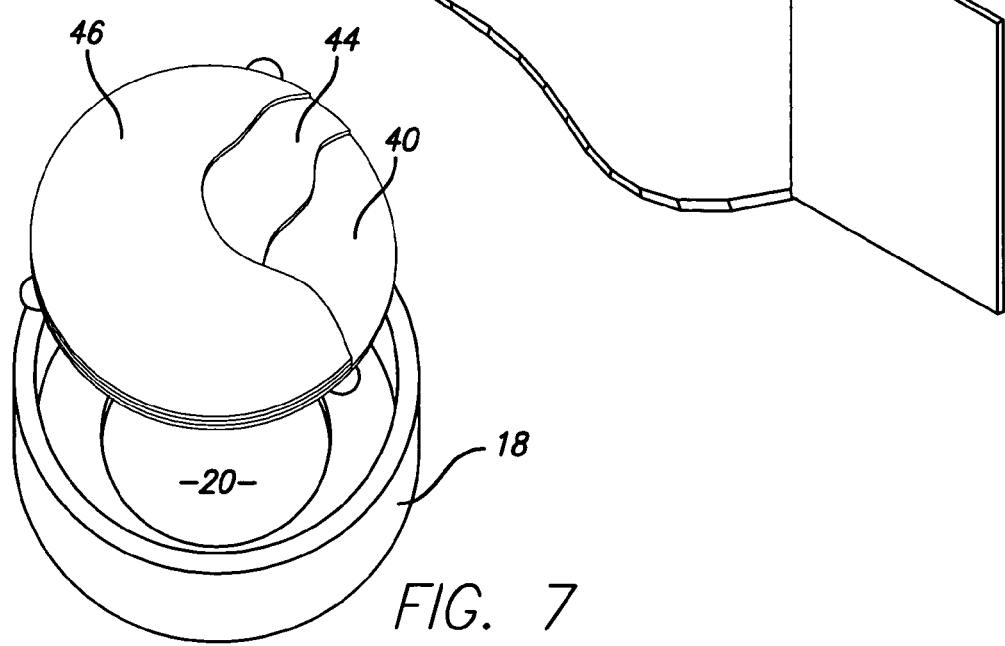
FIG. 7 is an exploded perspective view of a lens and cap of the present invention showing the protective material sub-layer and an optional coating sub-layer in cutaway.

As shown in FIG. 7 a radiation detector surface such as the exterior surface of the scintillator 40 is constructed or modified so that it has an associated thin layer of protective covering which may be a combination of sub-layers such as a protective material sub-layer 44 and an optional coating sub-layer 46. Methods that may be used to apply the protective material sub-layer 44 and an optional coating sub-layer 46 include, but are not limited to vacuum deposition, sputtering, and other methods known and yet to be discovered for applying thin layers of material. These methods allow the controlled application of thin layers to the radiation detector surfaces. For example, in one preferred embodiment, the invention uses a PMT with a plastic scintillator that is placed in a vacuum deposition chamber and a 60 nm layer of aluminum is placed on the exterior surface thereof. To protect the aluminum mirror a silicon oxide coating sub-layer 46 is applied over the aluminum. The total thickness for the silicon oxide coating is 60 nm. In this preferred embodiment, therefore, there may be up to 120 nm thickness for the combined aluminum and silicon oxide. Such a process has been performed by UVIRA of Merlin, Oreg. on behalf of the assignee of the present invention.

Method of Use

One of the advantages of the present invention is that it does not change how the radiation detector may be used as compared to known radiation detectors other than that the radiation detector of the present invention is capable of measuring lower energy or lower levels of radiation more accurately than known radiation detectors.

Alternatives

The examples set forth above are meant to be exemplary and are not meant to limit the scope of the invention.

It should be noted that variations of the examples may use alternative radiation measuring components including, but not limited to sensitive radiation measuring components such as Photomultiplier Tubes (PMTs), Geiger-Mueller Tubes (GMTs), or Solid State detectors (SSDs).

It should be noted that variations of the examples might use alternative structure to support the thin layer of protective covering such as a scintillator, a glass cover, or a chip surface. It should be noted that variations of the examples might use alternative different reflective materials used for the protective material layer and/or coating layer, different thicknesses of the protective material layer and/or coating layer, and/or different methods of applying the protective material layer and/or coating layer.

It should be noted that the dual surface mirror could be replaced with a single surface mirror. A single surface mirror embodiment may be less efficient, but would still be functional. For example, a black surface (or other absorbent surface) could be used on an opposite side of a single surface mirror. The absorbent surface would absorb the incoming ambient light.

It should be noted that the thin layer of protective covering may be on the top surface of the detector surface (as shown) or it may be on the bottom surface or manufactured within the detector. All of these configurations would be considered "covering" the detector surface.

The protective lens package may be secured in a variety of ways including, but not limited to, using an adhesive 48 (e.g. on the outer peripheral surface, exterior surface, or interior surface of the protective lens package or on tabs associated with the protective lens package). Preferably, the adhesive is non-reactive with the scintillator material and non-out gassing. Alternative embodiments may use other securing mechanism (e.g. structural securers such as clips or tabs) to secure the protective lens package, may secure the protective lens package in alternative positions, or may be held in place by pressure (e.g. if a special protective lens package was designed to fit into the enclosure cap 18 or by the protective lens package being sandwiched between the top of the photomultiplier tube 10 and the bottom of the enclosure cap 18).

The terms and expressions that have been employed in the foregoing specification are used as terms of description and not of limitation, and are not intended to exclude equivalents of the features shown and described or portions of them. The scope of the invention is defined and limited only by the claims that follow.

What is claimed is:

1. A radiation detector comprising:
   (a) a radiation detector with at least one radiation measuring component, said at least one radiation measuring component being a sensitive radiation measuring component;
   (b) a scintillator;
   (c) a reflective material layer substantially covering said scintillator, said reflective material layer protecting said sensitive measuring component; and
   (d) said reflective material layer is a two surface mirror.

2. The radiation detector of claim 1 wherein said reflective material layer is deposited on said scintillator by a depositing process selected from the group consisting of:
   (a) vacuum deposition; and
   (b) sputtering.

3. The radiation detector of claim 1 wherein said reflective material layer is a layer of material selected from the group consisting of:
   (a) aluminum;
   (b) gold; and
   (c) silver.

4. The radiation detector of claim 1 further comprising a protective coating substantially covering said reflective material layer.

5. The radiation detector of claim 1 further comprising a protective coating substantially covering said reflective material layer, said protective coating selected from the group consisting of:
   (a) silicon oxide;
   (b) magnesium fluoride; and
   (c) oxidized aluminum.

6. A radiation detector comprising:
   (a) a radiation detector with at least one radiation measuring component;
   (b) a radiation detector surface;
   (c) a layer of protective covering substantially covering said radiation detector surface, said layer of protective covering protecting said at least one radiation measuring component;
   (d) said layer of protective covering includes a protective material sub-layer, wherein said protective material sub-layer is a two surface mirror.

7. The radiation detector of claim 6 wherein said layer of protective covering is deposited on said radiation detector surface by a depositing process selected from the group consisting of:
   (a) vacuum deposition; and
   (b) sputtering.

8. The radiation detector of claim 6 wherein said protective material sub-layer is a layer of material selected from the group consisting of:
   (a) aluminum;
   (b) gold; and
   (c) silver.

9. The radiation detector of claim 6 wherein said layer of protective covering includes a protective material sub-layer and a coating sub-layer, said coating sub-layer substantially covering said protective material sub-layer.

10. The radiation detector of claim 9 wherein said coating sub-layer is selected from the group consisting of:
(a) silicon oxide;
(b) magnesium fluoride; and
(c) oxidized aluminum.

11. The radiation detector of claim 6 wherein said radiation detector surface is selected from the group consisting of:
(a) a scintillator;
(b) a cover glass; and
(c) a chip surface.

12. A method for modifying a known radiation detector to create a low threshold level radiation detector, said method comprising the steps of:
(a) providing a known radiation detector having a radiation measuring component positioned within an outer housing, a radiation detector surface, an enclosure cap defining a cap window, and a window cover covering said cap window;
(b) removing said enclosure cap from said outer housing;
(c) removing said window cover from said enclosure cap;
(d) removing said radiation detector surface;
(e) providing a protective lens package having a radiation detector surface covered with a protective material sub-layer;
(f) securing said protective lens package within said enclosure cap to cover said cap window; and
(g) replacing the combination protective lens package and enclosure cap to secure said radiation measuring component within said outer housing.

* * * * *